Sept. 13, 1949.  R. R. RANDALL  2,481,873
NON-TORQUE-EQUALIZING DIFFERENTIAL TRANSMISSION
Filed Oct. 1, 1947  2 Sheets-Sheet 1
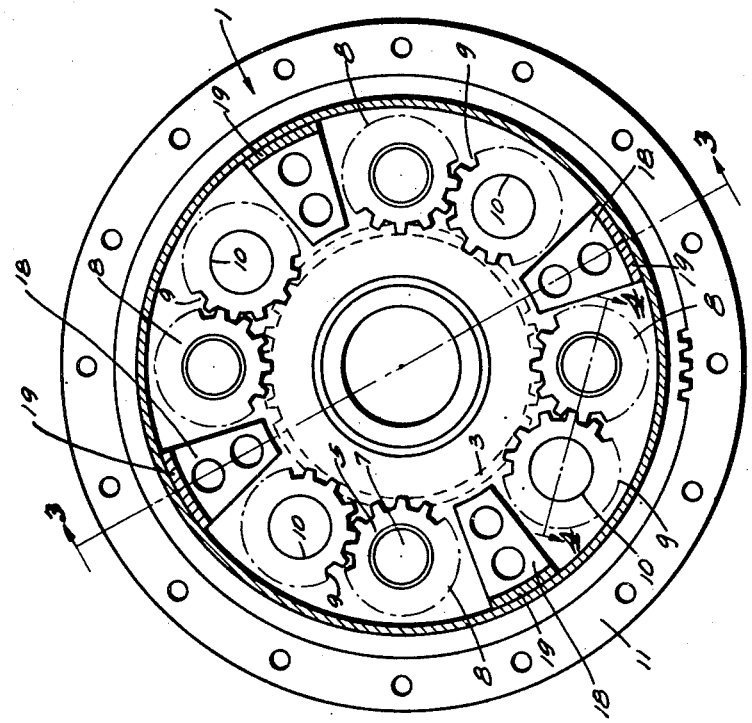
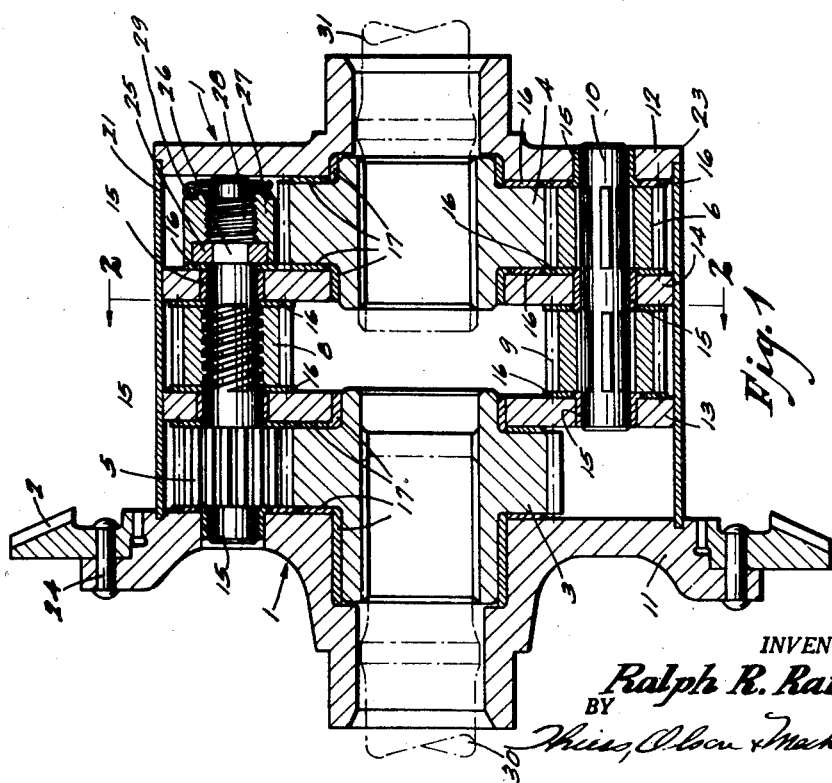
INVENTOR:
Ralph R. Randall
BY
Attorneys Sept. 13, 1949. R. R. RANDALL 2,481,873
NON-TORQUE-EQUALIZING DIFFERENTIAL TRANSMISSION
Filed Oct. 1, 1947 2 Sheets-Sheet 2
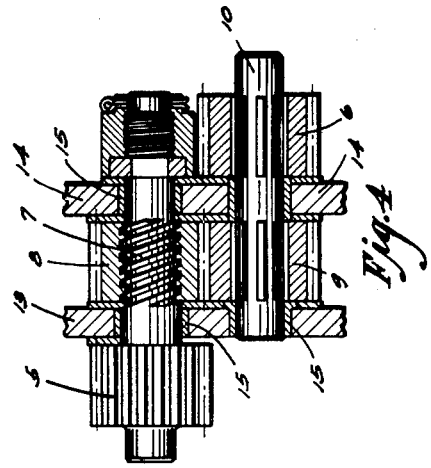
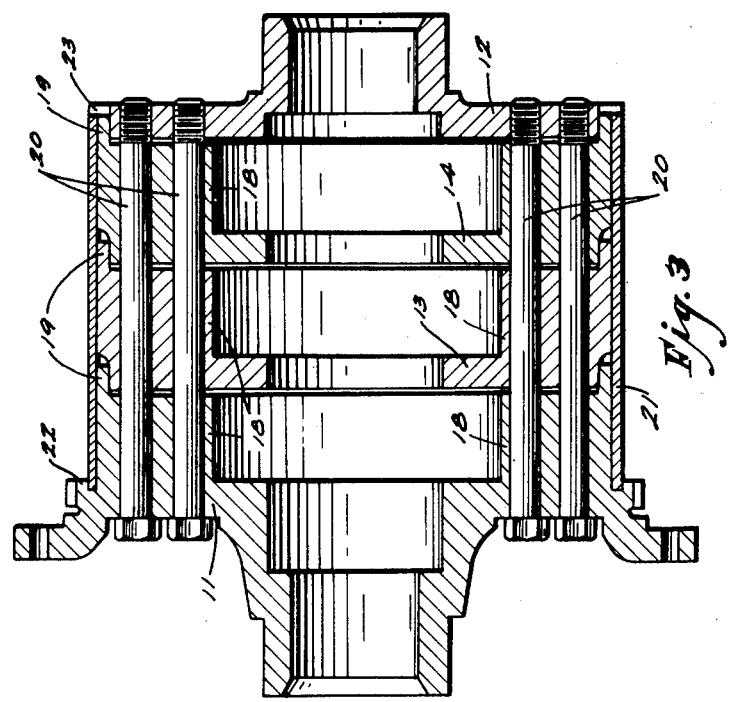
INVENTOR.
Ralph R. Randall
BY
Thiess, Olson & Mecklenburger
Attorneys Patented Sept. 13, 1949

2,481,873

UNITED STATES PATENT OFFICE 2,481,873

NON-TORQUE-EQUALIZING DIFFERENTIAL TRANSMISSION

Ralph R. Randall, Freeport, Ill., assignor, by mesne assignments, to Dualoc Engineering Co., Rockford, Ill., a corporation of Illinois Application October 1, 1947, Serial No. 777,178

6 Claims. (Cl. 74—711)

My invention relates to non-torque-equalizing differential transmissions.

One of the objects of my invention is to provide a non-equalizing torque differential transmission which will be compact and rugged in construction, efficient in operation, durable in use and relatively inexpensive to manufacture.

A further object is to provide such a construction using simple spur gear transmission elements and simple screw threaded constructions for the locking action.

A further object of my invention is to provide a non-torque-equalizing differential transmission using simple spur gear transmission elements and simple screw-threaded constructions for the locking action which will be satisfactory for use in heavy duty work such as on Caterpillars or the like.

Further objects and advantages of the invention will be apparent from the description and claims.

In the drawings, in which an embodiment of my invention is shown,

Figure 1 is an axial section of a differential transmission;

Fig. 2 is a section substantially on the line 2—2 of Fig. 1;

Fig. 3 is a section substantially on the line 3—3 of Fig. 2, and

Fig. 4 is a section substantially on the line 4—4 of Fig. 2.

Referring to the drawings in detail, the construction shown comprises a rotatable gear carrier 1 which may be driven through the bevel gear 2 from the propeller shaft of a motor vehicle, two spur gears 3 and 4 coaxial with the rotatable gear carrier 1 and rotatably mounted with respect thereto, to which the axles of the ground engaging wheels may be splined, respectively, and transmission between said gear carrier 1 and spur gears 3 and 4 comprising a plurality of pairs of spur gears, one gear 5 of each pair meshing with the axle gear 3 and the other gear 6 of each of said pairs meshing with the other axle gear 4, a plurality of externally threaded shafts 7 rotatable, respectively, with one of the spur gears 5, a plurality of internally-threaded spur gears 8, one threaded on each shaft 7, a plurality of spur gears 9 meshing, respectively, with said internally-threaded spur gears 8 and rotatable, respectively, with the gears 6, and means for limiting the threading movement of said threaded gears 8 on said threaded shafts 7 to lock the threaded gears and threaded shafts to the gear carrier 1.

The gears 9 and 6 are keyed to the shafts 10.

The gear carrier 1 comprises two end bearing plates 11 and 12 and two intermediate bearing plates 13 and 14. The shafts 7 and 10 are journaled in bearings 15 in these bearing plates 11, 12, 13 and 14. These bearing plates are also provided with suitable antifriction end thrust collars or washers 16. The gears 3 and 4 are also provided with suitable antifriction collars 17.

The bearing plates 11, 13 and 14 are each provided with four spacer lugs 18 having laterally extending tongues 19 fitting in correspondingly-shaped notches in the peripheries of the bearing plates 12, 13 and 14. These bearing plates and the gears and shafts assembled therewith are held in place by means of bolts 20 extending through registering openings in the spacer lugs 18 as shown in Fig. 3. The ends of these bolts are screwed into tapped openings in the bearing plate 12. By screwing in the bolts 20, the plates 11 and 12 are drawn toward each other, the spacer lugs 18 serving to limit the clamping action of the bolts 20. In order to prevent oil leakage and in order to stiffen up the construction, a suitable cylindrical shell 21 may be slipped over the bearing plates and be clamped in position between the flanges 22 and 23 of the plates 11 and 12. The bevel gear 2 may be held in position on the plate 11 by means of suitable rivets 24, or the like.

In assembling the transmission, the gears 3 and 4 are placed in position in the plates or covers 11 and 12, the shafts 7 are placed in position in the intermediate plate 13, shafts 7 are then placed in position in the bearing openings in the end plate 11, the gears 8 and 9 are placed in position on the shafts 7 and 10, the intermediate plate 14 is placed in position with respect to the shafts 7 and 10, the bearing collars 25 are slipped on over the reduced necks 26 of the shaft 7, the nuts 27 are screwed onto the threaded extensions 28 of the bolt 7, the keepers 29 are slipped in place, the shell 21 is slipped over the bearing plates 13 and 14 and fitted against the end plate 11 and the sub-assembly of bearing plate 12, and spur pinion 4 is brought into position so that the flange 23 fits against the end of the shell 21, as shown in Figs. 1 and 3, and the bolts 20 are placed in position and threaded into the end plate 12. The axles 30 and 31 to which the ground-engaging wheels are secured are keyed to the hubs of the gears 3 and 4, respectively.

In use, if one ground-engaging wheel has traction and the other does not and power is being applied to turn the gear carrier 1, the threaded gears 8 will rotate slightly, due to the road resistance of the ground wheel which has traction until each of these internally threaded gears 8 has rotated sufficiently to cause it to clamp one or the other of the bearing plates 14 or 13 between either the shouldered collar 25 or the shouldered gear 5 to lock the internally-threaded gear 8, the gears 9 and 6, the threaded shaft 7 and the gear 5 against further rotation with respect to the gear carrier. Further driving force of the gear carrier will be transmitted directly to the axle gear and axle of that wheel which has traction through one or the other of the locked spur gears 5 or 6, regardless of the fact that one of the ground-engaging wheels has no tractive effect.

When both ground wheels have tractive effect and the vehicle is travelling a straight course, power will be transmitted equally to both ground wheels. If the vehicle is going around a corner and one or the other of the ground-engaging wheels has to precess, the driving effort will be transmitted to the locked lagging wheel, the other wheel precessing as required because of its engagement with the ground.

Further modifications will be apparent to those skilled in the art and it is desired, therefore, that the invention be limited only by the scope of the appended claims.

Having thus described my invention, what I claim and desire to secure by Letters Patent is:

1. A non-equalizing-torque differential comprising a rotatable gear carrier, two rotatably driven elements coaxial with said gear carrier and a transmission between said gear carrier and driven elements comprising a pair of spur gear elements rotatable with said driven elements, respectively, a second pair of spur gear elements meshing with said first pair of gear elements, respectively, an externally-screw-threaded shaft rotatable with one of said second pair of spur gear elements, an internally-threaded spur gear element having a threading movement on said shaft, a spur gear element meshing with said internally-threaded spur gear element and rotatable with the other one of said second pair of spur gear elements, and means for limiting the threading movement of said internally-threaded gear element on said threaded shaft acting to bind said threaded gear element and threaded shaft to said gear carrier comprising an abutment engaged by said gear element in its threading movement, said gear carrier comprising four coaxial axially spaced bearing plate members, one of said first pair of spur gear elements and one of said second pair of spur gear elements lying between an outside bearing plate member and an adjacent bearing plate member, and the other ones of said first and second pairs of spur gear elements lying between the other outside bearing plate member and the adjacent bearing plate member, said internally-threaded spur gear element and the spur gear element meshing therewith lying between the two intermediate bearing plate members.

2. A non-equalizing-torque differential comprising a rotatable gear carrier, two rotatably driven elements coaxial with said gear carrier and a transmission between said gear carrier and driven elements comprising a pair of spur gear elements rotatable with said driven elements, respectively, a second pair of spur gear elements meshing with said first pair of gear elements, respectively, an externally-screw-threaded shaft rotatable with one of said second pair of spur gear elements, an internally-threaded spur gear element having a threading movement on said shaft, a spur gear element meshing with said internally-threaded spur gear element and rotatable with the other one of said second pair of spur gear elements, and means for limiting the threading movement of said internally-threaded gear element on said threaded shaft acting to bind said threaded gear element and threaded shaft to said gear carrier comprising an abutment engaged by said gear element in its threading movement, said gear carrier comprising four coaxial axially spaced bearing plate members, one of said first pair of spur gear elements and one of said second pair of spur gear elements lying between an outside bearing plate member and an adjacent bearing plate member, and the other ones of said first and second pairs of spur gear elements lying between the other outside bearing plate member and the adjacent bearing plate member, said internally-threaded spur gear element and the spur gear element meshing therewith lying between the two intermediate bearing plate members, one or more of said bearing plates having spacer bosses thereon for spacing the plates apart.

3. A non-equalizing-torque differential comprising a rotatable gear carrier, two rotatably driven elements coaxial with said gear carrier and a transmission between said gear carrier and driven elements comprising a pair of spur gear elements rotatable with said driven elements, respectively, a second pair of spur gear elements meshing with said first pair of gear elements, respectively, an externally-screw-threaded shaft rotatable with one of said second pair of spur gear elements, an internally-threaded spur gear element having a threading movement on said shaft, a spur gear element meshing with said internally-threaded spur gear element and rotatable with the other one of said second pair of spur gear elements, means for limiting the threading movement of said internally-threaded gear element on said threaded shaft acting to bind said threaded gear element and threaded shaft to said gear carrier comprising an abutment engaged by said gear element in its threading movement, said gear carrier comprising four coaxial axially spaced bearing plate members, one of said first pair of spur gear elements and one of said second pair of spur gear elements lying between an outside bearing plate member and an adjacent bearing plate member, and the other ones of said first and second pairs of spur gear elements lying between the other outside bearing plate member and the adjacent bearing plate member, said internally-threaded spur gear element and the spur gear element meshing therewith lying between the two intermediate bearing plate members, and means extending through said plates for clamping them together.

4. A non-equalizing-torque differential comprising a rotatable gear carrier, two rotatably driven elements coaxial with said gear carrier and a transmission between said gear carrier and driven elements comprising a pair of spur gear elements rotatable with said driven elements, respectively, a second pair of spur gear elements meshing with said first pair of gear elements, respectively, an externally-screw-threaded shaft rotatable with one of said second pair of spur gear elements, an internally-threaded spur gear element having a threading movement on said shaft, a spur gear element meshing with said internally-threaded spur gear element and rotatable with the other one of said second pair of spur gear elements, means for limiting the threading movement of said internally-threaded gear element on said threaded shaft acting to bind said threaded gear element and threaded shaft to said gear carrier comprising an abutment engaged by said gear element in its threading movement, said gear carrier comprising four coaxial axially spaced bearing plate members, one of said first pair of spur gear elements and one of said second pair of spur gear elements lying between an outside bearing plate member and an adjacent bearing plate member, and the other ones of said first and second pairs of spur gear elements lying between the other outside bearing plate member and the adjacent bearing plate member, said internally-threaded spur gear element and the spur gear element meshing therewith lying between the two intermediate bearing plate members, and a cylindrical shell surrounding said plates.

5. A non-equalizing-torque differential comprising a rotatable gear carrier, two rotatably driven elements coaxial with said gear carrier and a transmission between said gear carrier and driven elements comprising a pair of spur gear elements rotatable with said driven elements, respectively, a second pair of spur gear elements meshing with said first pair of gear elements, respectively, an externally-screw-threaded shaft rotatable with one of said second pair of spur gear elements, an internally-threaded spur gear element having a threading movement on said shaft, a spur gear element meshing with said internally-threaded spur gear element and rotatable with the other one of said second pair of spur gear elements, means for limiting the threading movement of said internally-threaded gear element on said threaded shaft acting to bind said threaded gear element and threaded shaft to said gear carrier comprising an abutment engaged by said gear element in its threading movement, said gear carrier comprising four coaxial axially spaced bearing plate members, one of said first pair of spur gear elements and one of said second pair of spur gear elements lying between an outside bearing plate member and an adjacent bearing plate member, and the other ones of said first and second pairs of spur gear elements lying between the other outside bearing plate member and the adjacent bearing plate member, said internally-threaded spur gear element and the spur gear element meshing therewith lying between the two intermediate bearing plate members, one or more of said bearing plates having spacer bosses thereon for spacing the plates apart, and a cylindrical shell surrounding said plates.

6. A non-equalizing-torque differential comprising a rotatable gear carrier, two rotatably driven elements coaxial with said gear carrier and a transmission between said gear carrier and driven elements comprising a pair of spur gear elements rotatable with said driven elements, respectively, a second pair of spur gear elements meshing with said first pair of gear elements, respectively, an externally-screw-threaded shaft rotatable with one of said second pair of spur gear elements, an internally-threaded spur gear element having a threading movement on said shaft, a spur gear element meshing with said internally-threaded spur gear element and rotatable with the other one of said second pair of spur gear elements, means for limiting the threading movement of said internally-threaded gear element on said threaded shaft acting to bind said threaded gear element and threaded shaft to said gear carrier comprising an abutment engaged by said gear element in its threading movement, said gear carrier comprising four coaxial axially spaced bearing plate members, one of said first pair of spur gear elements and one of said second pair of spur gear elements lying between an outside bearing plate member and an adjacent bearing plate member, and the other ones of said first and second pairs of spur gear elements lying between the other outside bearing plate member and the adjacent bearing plate member, said internally-threaded spur gear element and the spur gear element meshing therewith lying between the two intermediate bearing plate members, one or more of said bearing plates having spacer bosses thereon for spacing the plates apart, a cylindrical shell surrounding said plates, and means extending through said plates for clamping them together.

RALPH R. RANDALL.

REFERENCES CITED

The following references are of record in the file of this patent:

UNITED STATES PATENTS

| Number | Name | Date |
|---|---|---|
| 1,361,895 | Nogrady | Dec. 14, 1920 |
| 1,397,066 | Williams | Nov. 15, 1921 |
| 1,938,457 | McCattery | Dec. 5, 1933 |
| 1,938,649 | Welsh | Dec. 12, 1933 |
| 2,000,223 | Du Pras | May 7, 1935 |
| 2,424,942 | Mynssen | July 29, 1947 |

FOREIGN PATENTS

| Number | Country | Date |
|---|---|---|
| 19,249 | Australia | Sept. 16, 1929 |